United States Patent [19]

Gupta et al.

[11] 4,244,721

[45] Jan. 13, 1981

[54] METHOD OF MAKING COMPOSITE BOROSILICATE GLASS ARTICLES

[75] Inventors: Prabhat K. Gupta, Mt. Rainier, Md.; Martin G. Drexhage, Washington, D.C.; Pedro B. de Macedo, 6100 Highboro Dr., Bethesda, Md. 20034

[73] Assignees: Pedro Buarque de Macedo, Bethesda; Theodore A. Litovitz, Silver Spring, both of Md.

[21] Appl. No.: 8,158

[22] Filed: Jan. 31, 1979

Related U.S. Application Data

[63] Continuation of Ser. No. 827,448, Aug. 25, 1977, abandoned, which is a continuation-in-part of Ser. No. 724,852, Sep. 20, 1976, abandoned.

[51] Int. Cl.$^3$ ............................................. C03C 15/00
[52] U.S. Cl. ..................................... 65/31; 65/60 R; 65/111; 156/663; 427/309
[58] Field of Search ............... 65/31, 60 R, 30 R, 111, 65/60 D, 117, 60 B; 428/428, 427; 427/309; 156/663; 106/52, 54

[56] References Cited

U.S. PATENT DOCUMENTS

| | | | |
|---|---|---|---|
| 2,106,744 | 2/1938 | Hood et al. | 65/31 X |
| 2,315,329 | 3/1943 | Hood et al. | 65/31 |
| 3,782,915 | 1/1974 | Filbert et al. | 65/31 X |
| 3,785,793 | 1/1974 | Park | 65/31 |
| 3,923,688 | 12/1975 | Hammel et al. | 106/54 X |
| 4,035,210 | 7/1977 | Ohyoshi et al. | 65/31 X |

*Primary Examiner*—Kenneth M. Schor
*Attorney, Agent, or Firm*—Fisher, Christen & Sabol

[57] ABSTRACT

A method for producing a glass article which comprises melting and forming a preshaped glass article having a composition in the phase separable regions of the alkali-boro-silicate or alkali-boro-germania-silicate systems, inducing the article to phase separate, leaching out a silica-poor phase from the surface layers only to form a structure having porous surface layers surrounding a solid region of substantially the original glass composition, washing this structure with an organic media which dissolves oxides of boron and other leaching reaction products, drying and heating to collapse the outer porous structure to form a glass having a silica-rich surface layer surrounding a solid region having substantially the original glass composition.

13 Claims, No Drawings

METHOD OF MAKING COMPOSITE BOROSILICATE GLASS ARTICLES

This application is a continuation of application Ser. No. 827,448, filed Aug. 25, 1977 and now abandoned, which in turn is a continuation-in-part of application Ser. No. 724,852, filed Sept. 20, 1976 and now abandoned.

BACKGROUND OF THE INVENTION

1. Field of the Invention

This invention relates to glass articles having walls whose composition in the surface layers is different from the interior. In particular this invention relates to a method of making such articles.

2. Brief Description of the Prior Art

U.S. Pat. Nos. 2,106,744 (1938); 2,215,039 (1940) and 2,355,746 (1944) granted to Messrs. H. E. Hood and M. E. Nordberg describe a method of producing glasses having almost pure silica in the surface layers and containing alkali-boro-silicate compositions in the interior. According to this method, an alkali-boro-silicate glass of phase-separable composition is melted in the usual manner and is then fabricated in the usual way into desired shapes.

The preformed article is then subjected to a heat-treatment. The glass article is then subjected to a leaching treatment in acid solutions whereby one of the phases is leached out up to a definite depth leaving the interior portion of the glass unaffected. The prior art process then employed a water wash. The article is then dried and consolidated at a high temperature giving rise to a desired composition profile across the walls of the glass article.

According to Hood and Nordberg, in articles produced by their processes, "there is a tendency to break during the dehydration and vitrification steps."

SUMMARY OF THE INVENTION

In accordance with the present invention, there is provided a novel method whereby the "breaking tendency" of partially leached articles is substantially reduced. The method involves treating partially leached articles, prior to dehydration and consolidation steps, in a suitable organic media or an aqueous mixture thereof.

In another embodiment of this invention a composition range is disclosed which reduces the breaking tendency substantially. In a further embodiment of this invention, a heat-treatment procedure is disclosed which also reduces the breaking tendency of partially leached articles.

DETAILED DESCRIPTION OF THE INVENTION

The present invention describes a method of producing glass articles in which the composition of the surface layers of the walls is richer in silica than the central layers. According to this invention a phase separable composition in alkali borosilicate or germanate systems having 0 to 5 mole percent alumina is melted and formed in the conventional manner. Suitable compositions have been described in previous patents: U.S. Pat. Nos. 2,106,744; 2,215,039; 2,355,746 (Hood and Nordberg); No. 3,843,341 (Hammel) and 3,938,974 (Macedo and Litovitz).

Depending on the composition, the glass is heat-treated at a temperature from about 500° C. to 700° C. for a few seconds to several weeks such that it separates into two phases having a totally interconnected microstructure with an average size of 100–2000 A preferably between 150 and 500 A. These dimensions are much smaller than the wall thickness of the preformed article.

One of the phases is mostly covalent and will be referred to as the "hard" phase. The other is predominantly ionic in nature and will be referred to as the "soft" phase. It has been found advantageous to heat treat the glass at as low as temperature as possible but one which is consistent with reasonably short heat treatment times. This reduces the possibility of any deformation of the preform due to viscous flow.

The soluble phase is then leached out by a suitable leaching solution only up to a definite depth leaving an unleached central layer in the glass walls. Since the glass article is not leached throughout its mass but only in the surface layers, we call it "the partial leaching technique" in contrast to other processes where the leaching is carried out throughout the mass of the article.

We have discovered that in order to increase the survival probability in the subsequent stages of the process, it is advantageous to wash the partially leached article with a suitable organic solution which should contain less than 50 weight percent water, preferably less than 25% water. The organic containing solvent media should be one that preferentially keeps in solution the oxides of boron and other leaching reaction products of the silica-poor phase which are formed during leaching, without substantially attacking the silica-poor phase. While not intending to be bound by the veracity of the mechanism, we theorize that removal of the oxides of boron and other leaching reaction products from the porous layer greatly increases the probability for the survival of the glass article through the process. If only water is used as a washing media, the silica-poor phase is attacked during washing, generating constantly new reaction products and preventing the porous glass from being cleaned. The organic components of the media are water miscible and include the lower molecular weight aliphatic alcohols, containing from 1 to 5 carbon atoms, or acetone or mixtures thereof, were found to be especially good, methanol and ethanol being preferable. The organics in an aqueous media decrease the rate of attack of water on the silica-poor phases while still permitting the porous glass to be washed. Merely washing with water as described by Hood and Nordberg results in excessively large breakage rates in the later stages of the process, making it economically impractical. By using the approach of the present invention, i.e., washing with methanol at room temperature for times varying from 5 minutes to 24 hours, depending on the thickness of the leached layer, it is possible to reduce the breakage rate to a level where the process becomes economically feasible. The washing temperature is not critical. For economic reasons alone, it is desirable to carry out the washing at or near the room temperature.

After washing, the article is dried as usual and consolidated at temperatures in the range of 800°–1000° C., depending on the composition of the porous glass in the surface layers on solid glass objects such as tubes and bottles. The thickness of the silica-rich surface layer, which has greater strength than the remainder of the article, varies with the intended use. For example, the thickness may range from 0.1 mm for uses where minimum abrasion is present up to several mm for uses where severe conditions will be encountered. In each case, silica-rich surface layers of the desired thickness can be produced on all exposed surfaces of the article regardless of shape and the resultant article will have improved physico-chemical properties associated with the presence of silica-rich surfaces. The glass articles produced according to this invention can be used to make cooking utensils, radar domes, air and space craft windshields, windows for structural applications, containers such as jars, bottles and pipes, and chemical ware such as reaction vats.

We have further discovered that the breakage rate is substantially reduced provided the composition is selected from the following ranges (in mole percent):

|         | Broad     | Preferred | Most Preferred |
|---------|-----------|-----------|----------------|
| $SiO_2$ | 50–66     | 58–65     | 60–62.5        |
| $B_2O_3$| 28–42     | 30–35     | 32–35          |
| $R_2O$  | 3.5–9     | 4–7       | 4.5–5.5        |
| $Al_2O_3$| 0–3      | 0–1       | 0–0.5          |
| $\rho$  | 0.4–0.85  | 0.5–0.75  | 0.6–0.7        | where $R_2O$ is the total concentration of all alkali metal oxides and $\rho$ is the ratio of the sum of $K_2O$, $Rb_2O$ and $Cs_2O$ contents to $R_2O$ content.

We have also discovered that:

(i) The most preferred composition range yields the highest survival rates for a given article. As one goes to the preferred and then to the broad range, good survival rates are still obtained. However, the survival probability decreases from the preferred range to the broad range.

(ii) The survival probability increases as the ratio, x, of thickness of porous layer to wall thickness of the article increases for any given composition and processing conditions.

(iii) The survival probability is high, provided the heat treatment to cause phase separation is chosen according to the following table:

|             | Broad    | Preferred |
|-------------|----------|-----------|
| Temp. (C.)  | 480–550  | 500–530   |
| Time (hrs.) | ½–200    | 5–150     |

Finally, it is a well-known fact that the survival probability decreases as the size of the article increases. Therefore, whether in practice one uses the most preferred composition and/or heat-treatment ranges or the broadest ranges depends on the ratio, x, and the size of the article. For small size and larger x, the broad range may be most economical. On the other hand, large article size and small values of x clearly require the most preferred range.

EXAMPLES

1. A mixture having the composition (in mole %) 4 $Na_2O$, 4 $K_2O$, 36 $B_2O_3$ and 56 $SiO_2$ was melted and stirred to produce a homogeneous melt from which rods were drawn having a diameter in the range of 7 to 8 mm. The rods were heat-treated at 550° C. for 1.5 hrs. to cause phase separation and then the furnace was cooled.

The rods were partially leached at 95° C. with 3N HCl. The leaching time was chosen to be two hrs. which corresponded to a leached layer of about 1 mm in thickness. The partially leached rods were washed in methanol at room temperature for a period of 24 hrs. and dessicated at room temperature for 24 hrs. The rods were heated at a rate of 1° C./min. up to 150° C. and then at a rate of 2° C./min. up to about 850° C. when they consolidated. The glass article thus produced was clear in appearance and had a surface layer 1 mm thick containing more than 90 mole % of $SiO_2$.

Photoelastic measurements showed that the surface layer had a uniform compression of 24,000 psi. The process may also be carried out using ethanol, propanol, acetone and aqueous mixtures containing 50 wt. % methanol and 75 wt. % methanol instead of methanol in the above example.

2. A mixture having the composition (in mole percent) 61.3 $SiO_2$, 33.4 $B_2O_3$, 1.8 $Na_2O$ and 3.5 $K_2O$ was melted and stirred to produce a homogeneous melt from which rods were drawn having diameters in the range of 7 to 8 mm. The rods were heat-treated at 515° C. for 100 hrs. to cause phase separation and the furnace was cooled.

The rods were partially leached, washed, dried and consolidated as described in Example 1. Breakage rate was found to be less than 5%. The finished rods had a surface layer about 0.50 mm thick in compression of about 30,000 psi. These rods were abraded and tested in three point bending. The modulus of rupture was found to be 40,000 psi.

We claim:

1. A method for producing a glass article which comprises melting a composition in the phase separable regions of the alkali-borosilicate or alkali-boro-germania-silicate systems and forming a preshaped glass article, inducing the preshaped article to phase separate into a silica-rich phase and a silica-poor phase by heat-treating it at 480° C. to 550° C. for 0.5 to 200 hours, leaching out the silica-poor phase only from the surface layers of the article so as to form a structure having porous surface layers surrounding an unleached region of substantially the original glass composition, washing this structure with an organic media which contains less than 50% by weight water to dissolve and remove oxides of boron and other leaching reaction products without substantially attacking the silica-poor phase which remains in the structure, said organic media including a member selected from the group consisting of lower aliphatic alcohols containing from one to five carbon atoms, acetone, or mixtures thereof, drying and heating the washed glass article to collapse the outer porous surface layers to form a glass having a silica-rich surface layer surrounding said unleached region of substantially the original glass composition.

2. A method according to claim 1 wherein the organic media contains less than 25% $H_2O$.

3. A method according to claim 1 where the organic media is a low molecular weight alcohol containing 1–5 carbon atoms or a mixture of such alcohols.

4. A method according to claim 1 where the organic media is methanol.

5. A method according to claim 1 wherein the organic media is acetone.

6. A method according to claim 1 wherein said structure is washed with said organic media for a period of time between 5 minutes and 24 hours.

7. A method according to claim 1 wherein said composition in mole percent is in the range $SiO_2$: 50–66
$B_2O_3$: 28–42
$R_2O$: 3.5–9.0

Al$_2$O$_3$: 0–3, where R$_2$O represents the total alkali metal oxide content, and said composition has the ratio, $\rho$, of the sum of the K$_2$O, Rb$_2$O, and Cs$_2$O contents to the R$_2$O content, in the range 0.4 to 0.85.

8. A method according to claim 7 wherein said composition in mole percent is in the range SiO$_2$: 58–65
B$_2$O$_3$: 30–35
R$_2$O: 4–7
Al$_2$O$_3$: 0–1
$\rho$: 0.5–0.75.

9. A method according to claim 7 wherein said composition in mole percent is in the range SiO$_2$: 60–62.5
B$_2$O$_3$: 32–35
R$_2$O: 4.5–5.5
Al$_2$O$_3$: 0–0.5
$\rho$: 0.6–0.7.

10. A method according to claim 9 wherein Na$_2$O and K$_2$O are the only R$_2$O components present.

11. A method according to claim 7, 8, 9, or 10 wherein the organic media is methanol.

12. A method according to claim 10 wherein said heat treatment is in the temperature range 500°–530° C. for a period of time in the range of 5–150 hours.

13. A method according to claim 12 wherein the organic media is methanol.

* * * * *